US005785886A

United States Patent [19]

[11] Patent Number: 5,785,886

[45] Date of Patent: *Jul. 28, 1998

Kerschner et al.

[54] BLEACHING COMPOSITIONS CONTAINING IMINE HYDROGEN PEROXIDE AND A TRANSITION METAL CATALYST

[75] Inventors: Judith Lynne Kerschner, Ridgewood, N.J.; Stephen Alan Madison, New City, N.Y.; Catherine Victoria Chin Quee-Smith, Teaneck, N.J.

[73] Assignee: Lever Brothers Company, Division of Conopco, Inc., New York, N.Y.

[ * ] Notice: The term of this patent shall not extend beyond the expiration date of Pat. No. 5,653,910.

[21] Appl. No.: 814,647

[22] Filed: Mar. 10, 1997

Related U.S. Application Data

[62] Division of Ser. No. 481,569, Jun. 7, 1995, Pat. No. 5,653,910.

[51] Int. Cl.$^6$ .............................. C01B 15/00; D06L 3/02

[52] U.S. Cl. .............................. 252/186.33; 252/186.29; 252/186.27; 252/186.43; 252/186.28; 8/111

[58] Field of Search ........................ 252/186.33, 186.29, 252/186.27, 186.43, 186.28; 8/111

[56] References Cited

U.S. PATENT DOCUMENTS

| | | | |
|---|---|---|---|
| 4,451,384 | 5/1984 | Malafosse | 510/314 |
| 5,041,142 | 8/1991 | Ellis | 8/111 |
| 5,041,232 | 8/1991 | Batal et al. | 510/116 |
| 5,045,223 | 9/1991 | Batal et al. | 510/116 |
| 5,047,163 | 9/1991 | Batal et al. | 510/116 |
| 5,264,143 | 11/1993 | Boutique | 510/303 |
| 5,360,568 | 11/1994 | Madison et al. | 510/371 |
| 5,360,569 | 11/1994 | Madison et al. | 510/371 |
| 5,370,826 | 12/1994 | Madison et al. | 8/111 |

FOREIGN PATENT DOCUMENTS

| | | |
|---|---|---|
| 0 446 982 | 9/1991 | European Pat. Off. . |
| 0 509 787 | 10/1992 | European Pat. Off. . |
| 368262 | 5/1973 | U.S.S.R. . |

OTHER PUBLICATIONS

J. Chem. Soc. Perkin Trans. 1 (1995), pp. 699–704.

Chem. Abs. 124:235587 (1995).

*Primary Examiner*—Joseph D. Anthony
*Attorney, Agent, or Firm*—Milton L. Honig

[57] ABSTRACT

A bleach system is described that includes a peroxygen compound which is hydrogen peroxide or an inorganic substance that generates hydrogen peroxide in water, a $C_1$–$C_{30}$ imine and a transition metal catalyst. Use of the transition metal catalyst promotes the interaction of the hydrogen peroxide and imine thereby enhancing bleach performance.

5 Claims, No Drawings

BLEACHING COMPOSITIONS CONTAINING IMINE HYDROGEN PEROXIDE AND A TRANSITION METAL CATALYST

This is a Divisional application of Ser. No. 08/481,569 filed Jun. 7, 1995 now U.S. Pat. No. 5,653,910.

BACKGROUND OF THE INVENTION

1. Field of the Invention

The invention relates to bleaching systems employing imines and hydrogen peroxide activated with a transition metal catalyst.

2. The Related Art

Sulfonimines in the presence of organic peracids or peracid precursors are excellent bleaches. Their performance is reported in U.S. Pat. No. 5,041,232; U.S. Pat. No. 5,045,223 and U.S. Pat. No. 5,047,163, all to Batal et al. Likewise, imine quaternary salts have been shown to be good oxidants in the presence of organic peracids or peracid precursors. These systems have been described in U.S. Pat. No. 5,360,568; U.S. Pat. No. 5,360,569 and U.S. Pat. No. 5,370,826, all to Madison et al.

Hydrogen peroxide is a good oxidizing agent. It presents economic advantages over organic peracids because it is readily available and inexpensive. The art has however not been able to achieve satisfactory bleaching of stains (e.g. on fabrics or hard surfaces) with hydrogen peroxide as the oxidant Accordingly, it is an object of the present invention to provide a bleaching system utilizing hydrogen peroxide as an oxidant in combination with imines to achieve limproved efficacy in bleaching stained substrates.

Another object of the present invention is to provide a bleaching system for removing stains from fabrics over a wide temperature range including that of under 60° C., and especially under 30° C.

Still another object of the present invention is to provide a bleaching system capable of removing stains from substrates such as fabrics, household hard surfaces including sinks, toilets and the like, and even dentures.

Yet another object of the present invention is to provide a bleaching system effective in relatively small amounts so as to be commercially cost effective.

Other objects of the present invention will become apparent through the following summary, detailed description and examples.

SUMMARY OF THE INVENTION

A bleaching composition is provided including:

i) from 1 to 60% by weight of a peroxygen compound which is hydrogen peroxide or an inorganic substance that generates hydrogen peroxide in water;

ii) from 0.01 to 10% by weight of a $C_1$–$C_{30}$ imine; and iii) from 0.001 to 10% by weight of a transition metal catalyst.

Additionally, there is provided a method for bleaching a stained substrate that includes treating the stained substrate with hydrogen peroxide or an inorganic hydrogen peroxide generating compound, a $C_1$–$C_{30}$ imine and a transition metal catalyst.

DETAILED DESCRIPTION

Now it has been found that transition metal catalysts can activate hydrogen peroxide to combine with imines thereby forming a highly effective bleaching system. The system is particularly effective at removing stains even at relatively low temperature.

Thus, a first essential element of compositions according to the present invention is that of a $C_1$–$C_{30}$ imine, especially where the nitrogen forming the imine is relatively electron deficient. Structures typical of imines useful for this invention are those of I and II outlined below.

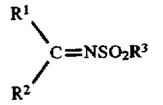
(I)

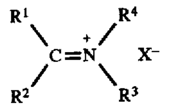
(II)

wherein:

$R^1$ and $R^4$ may be hydrogen or a $C_1$–$C_{30}$ substituted or unsubstituted radical selected from the group consisting of phenyl, aryl, heterocyclic ring, alkyl and cycloalkyl radicals;

$R^2$ may be hydrogen or a $C_1$–$C_{30}$ substituted or unsubstituted radical selected from the group consisting of phenyl, aryl, heterocyclic ring, alkyl, cycloalkyl, nitro, halo, cyano, alkoxy, keto, carboxylic and carboalkoxy radicals;

$R^3$ may be a $C_1$–$C_{30}$ substituted or unsubstituted radical selected from the group consisting of phenyl, aryl, heterocyclic ring, alkyl, cycloalkyl, nitro, halo, and cyano radicals;

$R^1$ with $R^2$ and $R^2$ with $R^3$ may respectively together form a cycloalkyl, polycyclo, heterocyclic or aromatic ring systems; and $X^-$ is a counterion stable in the presence of oxidizing agents.

Heterocyclic rings according to this invention include cycloaliphatic and cycloaromatic type radicals incorporating an oxygen, sulfur and/or nitrogen atom within the ring systems. Representative nitrogen heterocycles include pyridine, pyrrole, imidazole, triazole, tetrazole, morpholine, pyrrolidine, piperidine and piperazine. Suitable oxygen heterocycles include furan, tetrahydrofuran and dioxane. Sulfur heterocycles may include thiophene and tetrahydrothiophene.

Counterion $X^-$ may be selected from chloride, bromide, sulfate, methosulfate, sulfonate, p-toluenesulfonate, borontetrafluoride, $PF_6^-$, phosphate and cyano radicals.

The term "substituted" is defined in relation to $R^1$, $R^2$, $R^3$ and $R^4$ as a substituent which is a nitro, halo, cyano, $C_1$–$C_{20}$ alkyl, amino, aminoalkyl, thioalkyl, sulfoalkyl, carboxyester, hydroxy, $C_1$–$C_{20}$ alkoxy, polyalkoxy or $C_1$–$C_{40}$ quaternary di- or tri-alkylammonium function.

Imines of structure (I) are referred to as sulfonimine compounds. Several of these substances are listed in Table 1. Therein, $R^1$ is hydrogen, $R^2$ is phenyl with an X substituent, and $R^3$ is phenyl with a Y substituent. Very often X and Y groups are water-solubilizing groups, most commonly being carboxylic acid or salts thereof. Representative structures are as follows.

TABLE I

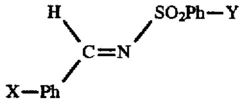

| | X | Y | |
|---|---|---|---|
| SULF 1 | 4-$CO_2H$ | 4-Cl | 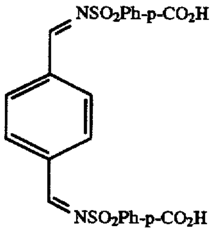 |
| SULF 2 | 4-$CO_2H$ | H | |
| SULF 3 | 4-Cl | 4-$CO_2H$ | |
| SULF 4 | H | 4-$CO_2H$ | |
| SULF 5 | 4-$CO_2H$ | 4-$CO_2H$ | |
| SULF 6 | 4-$CO_2H$ | 3-$NO_2$ | |
| SULF 7 | 4-CN | 4-$CO_2H$ | |
| SULF 8 | 4-OMe | 4-$CO_2H$ | |
| SULF 9 | 3-OH | 4-Cl | |
| | | | SULF 10 |

Illustrative of cycloaromatic and of heterocyclic nitrogen ring sulfonimines are the respective SULF 11 and SULF 12 whose structures are outlined below.

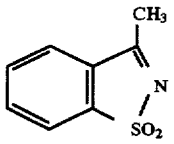

SULF 11

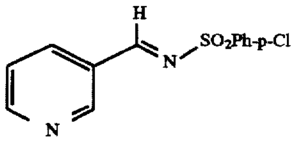

SULF 12

The following further compounds are illustrative of sulfonimines within the present invention.

N-Benzylidenebenzenesulfonamide
N-(4-Methylsulfinylbenzylidene)benzenesulfonamide
N-(4-Methylsulfonylbenzylidene)benzenesulfonamide
N-(3-Pyridinylmethylene)benzenesulfonamide
N-(4-Pyridinylmethylene)benzenesulfonamide
N-(2-Pyridinylmethylene)benzenesulfonamide
N-Benzylidine-3-pyridinesulfonamide
3-Trimethylammoniomethyl-1,2-benziosothiazole-1,1-dioxide chloride salt
N-(N-Methyl-3-pyridinylmethylene)benzenesulfonamide chloride salt
N-(4-Trimethylammoniobenzylidene)benzenesulfonamide chloride salt
N-Benzylidene-4-trimethylammoniobenzenesulfonamide chloride salt
N-(4-Cholyloxycarbonylbenzylidene)benzenesulfonamide chloride salt
N-Benzylidene-4-cholyloxycarbonylbenzenesulfonamide chloride salt
N-(4-Sulfoethylcarbonylbenzylidene)benzenesulfonamide sodium salt
Methyl N-(p-tolysulfonyl)iminoacetate
Phenylsulfonyliminoacetic acid
N-(α-Methylbenzylidend)benzenesulfonamide
N-Isopropylidenebenzenesulfonamide
N-Benzylidenemethanesulfonamide
N-(4-Carboxybenzylidene)methanesulfonamide
N-Benzylidenetrifluoromethanesulfonamide
N-(2,2,3,3,4,4,4-Heptafluorobutylidene)benzenesulfonamide N-(4-Dimethylsulfoniumbenzylidene)benzenesulfonamide chloride salt
N-(2-Furfurylidene)-4-carboxybenzenesulfonamide
N-(2-Pyrrolylmethylene)benzenesulfonamide
N-(4-Phenoxycarbonylbenzylidene)benzenesulfonamide
N-(2,6-Dicarboxy-4-pyridinylmethylene)benzenesulfonamide disodium salt Imines of structure 11 are known as quaternary imine salts, the most preferred being 3,4-dihydroisoquinolinium salts of structure III where $R^5$ and $R^6$ are defined by the same radicals as that for $R^2$.

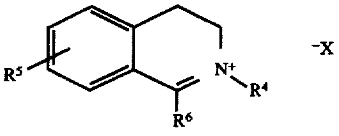

(III)

Table II lists specific illustrative compounds represented by structure III.

TABLE II

| COMPOUND | $R^4$ | $R^5$ | $R^6$ | $X^-$ |
|---|---|---|---|---|
| 1 | $CH_3$ | H | H | $BF4^-$ |
| 2 | $CH_3$ | H | H | p-tosylate$^-$ |
| 3 | $CH_3$ | $CH_3$ | H | $Cl^-$ |
| 4 | $CH_3$ | $NO_2$ | H | $Br^-$ |
| 5 | $CH_3$ | Cl | H | $BF4^-$ |
| 6 | $CH_3$ | $OCH_3$ | H | brosylate$^-$ |
| 7 | phenyl | H | H | $CH_3SO_4^-$ |
| 8 | benzyl | phenyl | H | $Cl^-$ |
| 9 | $(CH_2)_2OH$ | CN | H | $PF_6^-$ |
| 10 | $CH_3$ | $CH_2COCH_3$ | H | $PF_6^-$ |
| 11 | $(CH_3)_2CH$ | $COCH_3$ | H | $CH_3CH_2SO_4^-$ |
| 12 | $CH_3$ | $SC_2^-Na^+$ | H | $Cl^-$ |
| 13 | $CH_3(CH_2)_{11}$ | H | H | p-tosylate$^-$ |
| 14 | $CH_3(CH_2)_{15}$ | Br | H | $CH_3SO_4^-$ |
| 15 | $CH_2CH_2N(CH_3)_2$ | H | H | $Cl^-$ |
| 16 | $CH_3$ | F | H | $Cl^-$ |
| 17 | $CH_3$ | $CF_3$ | H | $PF6^-$ |
| 18 | $CH_3$ | $CH_2OPO_3Na_2$ | H | $Cl^-$ |
| 19 | $CH_3$ | pyridyl | H | $Cl^-$ |
| 20 | 2-pyridyl | H | H | $Cl^-$ |
| 21 | $CH_3$ | $CH_2N^+(CH_3)_3$ | H | $CH_3SO_4^-$ |
| 22 | $CH_3CH_2O(CH_2)_2$ | H | H | $CH_3SO_4^-$ |
| 23 | $CH_3$ | $CO_2^-Na^+$ | H | $Cl^-$ |
| 24 | $CH_3$ | $CO_2^-Na^+$ | H | $Cl^-$ |
| 25 | $(CH_2)_7CH_3$ | H | H | p-tosylate$^-$ |
| 26 | $CH_3$ | H | $CH_3$ | $Cl^-$ |
| 27 | $CH_3$ | H | phenyl | $Cl^-$ |

Additional compounds illustrative of quaternary amine salts according to the present invention are outlined below as structures IV through XI.

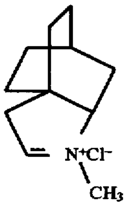

(IV)

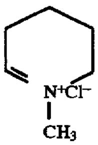

(V)

-continued (VI)

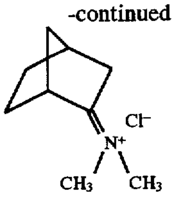

(VII)

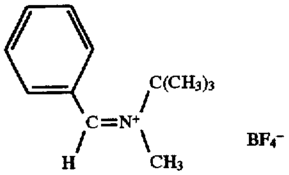

(VIII)

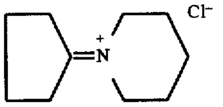

(IX)

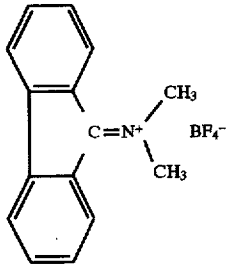

(X)

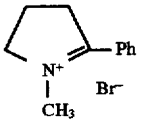

(XI)

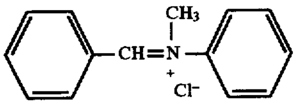

Amounts of the imine suitable for the present invention may range from 0.01 to 10%, preferably from 0.2 to 5%, optimally from 0.5 to 1.5% by weight of the composition.

A second essential element of compositions according to the present invention is that of hydrogen peroxide or an inorganic substance generating hydrogen peroxide upon contact with water. The latter category include alkali metal peroxides, alkaline earth metal peroxides and inorganic persalts. Sodium peroxide and calcium peroxide are examples of the alkali metal and alkaline earth metal peroxides, respectively. Inorganic persalts include metal (e.g. alkali metal or alkaline earth metal) salts of perborates, percarbonates, perphosphates, persilicates and persulphates. Particularly preferred are sodium percarbonate and sodium perborate monohydrate.

Hydrogen peroxide or the inorganic substance which generates hydrogen peroxide will be present in compositions according to the invention in amounts from 1 to 60%, preferably from 1.5 to 25%, optimally from 2 to 10% by weight. Molar ratios of hydrogen peroxide or the hydrogen peroxide generating substance relative to the imine may range from 1500:1 to 1:2, preferably from 150:1 to 1:1, optimally from 60:1 to 3:1.

A third important element of compositions according to the present invention is that of a transition metal catalyst. Suitable transition metals include ions selected from the group consisting of chromium, cobalt, titanium, nickel, iron, copper, molybdenum, vanadium, tungsten, palladium, platinum, lanthanum, rhenium, rhodium, ruthenium, manganese and mixtures thereof. These transition metal ions may form a salt or complex with inorganic anions or organic complexing ligands. Illustrative inorganic ions may be those selected from the group consisting of $F^-$, $Cl^-$, $Br^-$, $I^-$, $NO_3^-$, $ClO_4^-$, $SO_4^-$, $PO_4^-$, $H_2O$, $O_2^-$, $OH^-$, $HO_2^-$, $SH^-$, $S_2^-$, $N_3^-$, $SCN^-$, $NH_2^-$ and combinations thereof. Illustrative organic complexing ligands with which the transition metal may complex include those selected from the group consisting of $RCOO^-$, $PR_3$ or $NR_3$, where R is H, $C_1$–$C_{20}$ alkyl or aryl (optionally substituted), hexamethylphosphoric triamide, ethylenediamine, trimethylamine, bispyridylamine, pyridine, pyridazine, pyrimidine, pyrazine, imidazole, pyrazole and triazole rings. Other suitable ligands in their simplest forms are:

(i)
1,4,7-triazacyclononane;
1,4,7-triazacyclodecane;
1,4,7-trimethyl-1,4,7-triazacyclononane;
1,4,7-trimethyl-1,4,7-triazacyclodecane;
1,4,8-trimethyl-1,4,8-triazacycloundecane;
1,5,9-trimethyl-1,5,9-triazacyclododecane;
1,4-dimethyl-7-ethyl-1,4,7-triazacyclononane;

(ii)
tris(pyridin-2-yl)methane;
tris(pyrazol-1-yl)methane;
tris(imidazol-2-yl)methane;
tris(triazol-1-yl)methane;

(iii)
tris(pyridin-2-yl)borate;
tris(triazol)-1-yl)borate;
tris(imidazol-2-yl)phosphine;
tris(imidazol-2-yl)borate;

(iv)
cis-cis-1,3,5-trisamino-cyclohexane;
1,1,1-tris(methylamino)ethane;

(v)
bis(pyridin-2-yl-methyl)amine;
bis(pyrazol-1-yl-methyl)amine;
bis(triazol-1-yl-methyl)amine;
bis(imidazol-2-yl-methyl)amine.

These ligands may be substituted on the amine nitrogen atoms and/or $CH_2$ carbon atoms and/or aromatic rings.

Some examples of preferred ligands are:

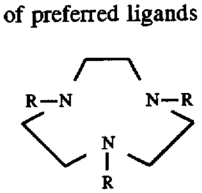

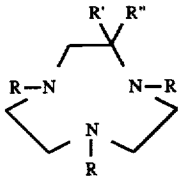

wherein each R is independently hydrogen or a $C_1$–$C_4$ alkyl group, preferably ethyl, most preferably methyl, and R' and R" are independently hydrogen or a $C_1$–$C_4$ alkyl group.

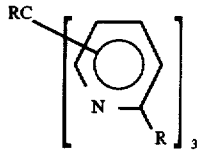

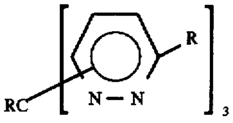

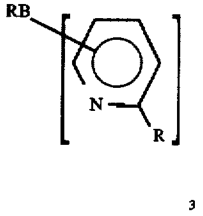

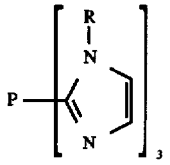

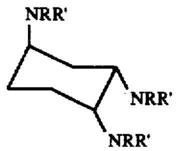

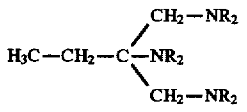

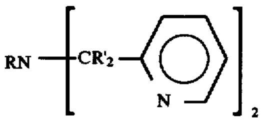

wherein:

R may each independently be H, alkyl, or aryl, optionally substituted; and $R^1$ may each independently be hydrogen or alkyl.

A still further useful ligand is di-(bis(2-(2-pyridyl)ethyl) amine)xylenol, illustrated below as a dicopper (I) (dihydroxyl)(dihexafluorophosphate) complex.

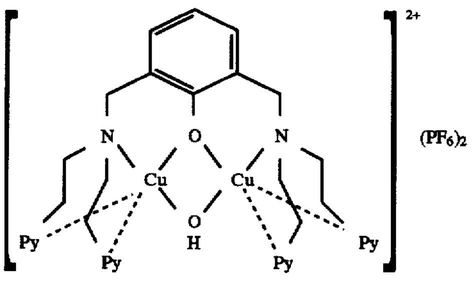

Amounts of the transition metal catalyst may range from 0.001 to 10%, preferably from 0.001 to 5%, optimally from 0.01 to 1% by weight.

Bleach systems of the present invention may be employed for a wide variety of purposes, but are especially useful in the cleaning of laundry. When intended for such purpose, the peroxygen compound, imine and transition metal catalyst of the present invention will usually also be combined with surface-active materials, detergency builders and other known ingredients of laundry detergent formulations.

The surface-active material may be naturally derived, such as soap or a synthetic material selected from anionic, nonionic, amphoteric, zwitterionic, cationic actives and mixtures thereof. Many suitable actives are commercially available and are fully described in the literature, for example in "Surface Active Agents and Detergents", Volumes I and II, by Schwartz, Perry and Berch. The total level of the surface-active material may range up to 50% by weight, preferably being from 1% to 40% by weight of the composition, most preferably 4 to 25%.

Synthetic anionic surface-actives are usually water-soluble alkali metal salts of organic sulfates and sulfonates having alkyl radicals containing from about 8 to about 22 carbon atoms.

Examples of suitable synthetic anionic detergent compounds are sodium and ammonium alkyl sulfates, especially those obtained by sulfating higher ($C_8$–$C_{18}$) alcohols produced for example from tallow or coconut oil; sodium and ammonium alkyl ($C_9$–$C_{20}$) benzene sulfonates, particularly sodium linear secondary alkyl ($C_{10}$–$C_{15}$) benzene sulfonates; sodium alkyl glyceryl ether sulfates, especially those ethers of the higher alcohols derived from tallow or coconut oil and synthetic alcohols derived from petroleum; sodium coconut oil fatty acid monoglyceride sulfates and sulfonates; sodium and ammonium salts of sulfuric acid esters of higher ($C_9$–$C_{18}$) fatty alcohol-alkylene oxide, particularly ethylene oxide reaction products; the reaction products of fatty acids such as coconut fatty acids esterified with isethionic acid and neutralized with sodium hydroxide; sodium and ammonium salts of fatty acid amides of methyl taurine; alkane monosulfonates such as those derived by reacting alpha-olefins ($C_8$–$C_{20}$) with sodium bisulfite and those derived by reacting paraffins with $SO_2$ and $Cl_2$ and then hydrolyzing with a base to produce a random sulfonate; sodium and ammonium $C_7$–$C_{12}$ dialkyl sulfosuccinates; and olefinic sulfonates, which term is used to describe the material made by reacting olefins, particularly $C_{10}$–$C_{20}$ alpha-olefins, with $SO_3$ and then neutralizing and hydrolyzing the reaction product. The preferred anionic detergent compounds are sodium ($C_{11}$–$C_{15}$) alkylbenzene sulfonates; sodium ($C_{16}$–$C_{18}$) alkyl sulfates and sodium ($C_{16}$–$C_{18}$) alkyl ether sulfates.

Examples of suitable nonionic surface-active compounds which may be used preferably together with the anionic surface-active compounds include, in particular, the reaction products of alkylene oxides, usually ethylene oxide, with alkyl ($C_6$–$C_{22}$) phenols, generally 2–25 EO, i.e. 2–25 units of ethylene oxide per molecule; the condensation products of aliphatic ($C_8$–$C_{18}$) primary or secondary linear or branched alcohols with ethylene oxide, generally 2–30 EO, and products made by condensation of ethylene oxide with the reaction products of propylene oxide and ethylenediamine. Other so-called nonionic surface-actives include alkylpolyglycosides, polyhydroxy fatty acid amides (e.g. $C_{12}$–$C_{18}$ N-methyl glucamide), long chain tertiary amine oxides, long chain tertiary phosphine oxides and dialkyl sulfoxides.

Amounts of amphoteric or zwitterionic surface-active compounds can also be used in the compositions of the invention but this is not normally desired owing to their relatively high cost. If any amphoteric or zwitterionic detergent compounds are used, it is generally in small amounts in compositions based on the much more commonly used synthetic anionic and nonionic actives.

Soaps may also be incorporated into the compositions of the invention, preferably at a level of less than 30% by weight. They are particularly useful at low levels in binary (soap/anionic) or ternary mixtures together with nonionic or mixed synthetic anionic and nonionic compounds. Soaps which are used are preferably the sodium, or less desirably potassium, salts of saturated or unsaturated $C_{10}$–$C_{24}$ fatty acids or mixtures thereof. The amount of such soaps can be varied between 0.5 and 25% by weight, with lower amounts of 0.5 to 5% being generally sufficient for lather control. Amounts of soap between 2 and 20%, especially between 5 and 15%, are used to give a beneficial effect on detergency. This is particularly valuable in compositions used in hard water when the soap acts as a supplementary builder.

The detergent compositions of the invention will normally also contain a detergency builder. Builder materials may be selected from (1) calcium sequestrant materials; (2) precipitating materials; (3) calcium ion-exchange materials; and (4) mixtures thereof.

In particular, the compositions of the invention may contain any one of the organic or inorganic builder materials, such as sodium or potassium tripolyphosphate, sodium or potassium pyrophosphate, sodium or potassium orthophosphate, sodium carbonate, the sodium salt of nitrilotriacetic acid, sodium citrate, carboxymethylmalonate, carboxymethyloxysuccinate, tartrate mono- and di-succinates, oxydisuccinate, crystalline or amorphous aluminosilicates and mixtures thereof.

Polycarboxylic homo- and copolymers may also be included as builders and to function as powder structurants or processing aids. Particularly preferred are polyacrylic acid (available under the trademark Acrysol from the Rohm and Haas Company) and acrylic-maleic acid copolymers (available under the trademark Sokalan from the BASF Corporation) and alkali metal or other salts thereof.

These builder materials may be present at a level from 1 to 80% by weight, preferably from 10 to 60% by weight.

Upon dispersal in a wash water, the initial amount of hydrogen peroxide or compound generating hydrogen peroxide should range in amount to yield anywhere from 0.05 to 250 ppm active oxygen per liter of water, preferably between 1 to 50 ppm. Within the wash media, the amount of imine initially present should be from 0.01 to 300 ppm, preferably from 1 to 100 ppm per liter of water. Amounts of the transition metal catalyst within the wash media will range from 0.001 to 300 ppm, preferably from 0.1 to 100 ppm per liter of water. Surfactant optionally may be present in the wash water from 0.05 to 1.0 grams per liter, preferably from 0.15 to 0.20 grams per liter. When present, the builder amount will range from 0.1 to 3.0 grams per liter.

Apart from the components already mentioned, the bleaching compositions of the invention can contain any of the conventional additives in the amounts in which such materials are normally employed in bleaching compositions. Examples of these additives include lather boosters such as alkanolamides, particularly the monoethanolamides derived from palmkernel fatty acids and coconut fatty acids, lather depressants such as alkyl phosphates and silicones, antiredeposition agents such as sodium carboxymethylcellulose and alkyl or substituted alkylcellulose ethers, other stabilizers such as ethylenediaminetetraacetic acid, fabric softening agents, inorganic salts such as sodium sulfate and usually present in very small amounts, fluorescent whitening agents, perfumes, enzymes such as proteases, cellulases, lipases and amylases, germicides and colorants.

Stained consumer products benefiting from treatment with compositions of this invention may include clothes and other fabrics; household fixtures and appliances such as sinks, toilet bowls and oven ranges; tableware such as drinking glasses, dishes, cookware and utensils; and even dentures. Hair colorants may also be formulated with the bleach composition of this invention. The bleaching system of this invention may also be applied to industrial uses such as for the bleaching of wood pulp.

The system of the present invention may be delivered in a variety of product forms including powders, on sheets or other substrates, in pouches, in tablets, in aqueous liquids, or in nonaqueous liquids such as liquid nonionic detergents.

The following examples will more fully illustrate the embodiments of this invention. All parts, percentages and proportions referred to herein and in the appended claims are by weight unless otherwise illustrated.

EXAMPLE 1

Stain bleaching experiments were conducted in a Terg-O-Tometer in 1L milli-Q water using four tea-stained cotton cloths measuring 3×4 inches. In a typical test, 1.10 g Ultra Surf® detergent was added to the wash water along with a specified amount of hydrogen peroxide. Then 6 ml aliquot of a $10^{-2}$M solution of imine (SULF-11) dissolved in acetonitrile was added to the Terg pot to obtain a final concentration of $6\times10^{-5}$M imine. The pH was adjusted to 10 and bleaching conducted at 32° C. for 15 minutes. The control employed no imine.

Stain bleaching was measured reflectometrically using a Garner BYK Colorgard System Reflectometer 2000/05. ΔR is the reflectance difference between washed and unwashed cloths; effects due to detergent are not subtracted. Bleaching was more specifically indicated by an increase in reflectance, reported as ΔΔR.

TABLE I

BLEACHING PERFORMANCE OF SULF-11 AND HYDROGEN PEROXIDE WITHOUT TRANSITION METAL CATALYST

| OXIDANT | CONCENTRATION (MOLAR) | ΔΔR |
|---|---|---|
| M-Chloroperbenzoic Acid | $4.6 \times 10^{-4}$ | 6.1 |
| Hydrogen Peroxide | $1.5 \times 10^{-3}$ | 3.3 |
| Hydrogen Peroxide | $1 \times 10^{-2}$ | 4.7 |
| Hydrogen Peroxide | $1 \times 10^{-1}$ | 12.1 |
| Hydrogen Peroxide | 1.0 | 9.2 |

From the results in Table I, it is evident that as the concentration of hydrogen peroxide increases, so does fabric bleaching. The results establish that hydrogen peroxide can activate Sulf-11 to give fabric bleaching. However, very high concentrations of hydrogen peroxide are necessary to achieve any significant stain removal.

EXAMPLE 2

This Example illustrates the improved performance effect when including a transition metal catalyst within the bleaching system. Wash conditions in the experiments of this Example were identical to that of Example 1, with one exception. Before hydrogen peroxide addition, 6 ml aliquot of a $10^{-2}$M solution of molybdenum metal catalyst was added to the terg pot to obtain a final concentration of $6\times10^{-5}$M. Table II summarizes the stain removal results.

TABLE II

BLEACHING PERFORMANCE OF SULF-11 AND HYDROGEN PEROXIDE IN THE PRESENCE OF A TRANSITION METAL CATALYST

| METAL CATALYST | OXIDANT | OXIDANT CONCENTRATION (MOLAR) | ΔR |
|---|---|---|---|
| None | m-Chloroperbenzoic Acid | $3.0 \times 10^{-4}$ | 5.0 |
| None | $H_2O_2$ | $1.5 \times 10^{-3}$ | 3.3 |
| $Mo(O)O_2)_2(HMPT)(H_2O)$ | $H_2O_2$ | $1.5 \times 10^{-3}$ | 5.0 |
| $Mo(O)O_2)_2(HMPT)(DMF)$ | $H_2O_2$ | $1.5 \times 10^{-3}$ | 4.5 |
| $Mo(O)O_2)_2(HMPT)_2$ | $H_2O_2$ | $1.5 \times 10^{-3}$ | 5.0 |

Table II establishes that stain removal was increased in the presence of the molybdenum complexes. Enhancement of performance is traced to the catalytic activation of the hydrogen peroxide by the transition metal catalyst. Bleaching activity is now comparable to that of Sulf-11 with a peracid.

EXAMPLE 3

Experiments reported herein were conducted to demonstrate that imines other than Sulf-11 are operative.

N-methyl 3,4-dihydroisoquinolinium p-toluene sulfonate (Imine Quat) was substituted for Sulf-11 in bleaching experiments identical to the conditions described in Example 2. Table III summarizes the results.

TABLE III

BLEACHING WITH IMINE QUAT AND HYDROGEN PEROXIDE IN THE PRESENCE OF A TRANSITION METAL CATALYST

| METAL CATALYST | OXIDANT | OXIDANT CONCENTRATION (MOLAR) | ΔR |
|---|---|---|---|
| None | m-Chloroperbenzoic Acid | $3.0 \times 10^{-4}$ | 10.8 |
| None | $H_2O_2$ | $1.5 \times 10^{-3}$ | 3.3 |
| $Mo(O)(O_2)_2(HMPT)(H_2O)$ | $H_2O_2$ | $1.5 \times 10^{-3}$ | 5.9 |

Table III demonstrates that although the combination of transition metal catalyst with hydrogen peroxide was not as effective as the peracid, there was an enhancement in stain removal as compared to hydrogen peroxide/imine quat without catalyst. These results indicate that hydrogen peroxide was activated by the molybdenum complex.

EXAMPLE 4

This Example demonstrates the effectiveness of a variety of transition metal catalysts. Wash conditions were identical to that described under Example 1.

TABLE IV

BLEACHING PERFORMANCE OF SULF-11 AND HYDROGEN PEROXIDE IN THE PRESENCE OF VARIOUS TRANSITION METAL CATALYSTS

| METAL CATALYST | OXIDANT | ΔR | ΔΔR |
|---|---|---|---|
| Control (None) | $H_2O_2$ | 2.7 | — |
| Freshly Formed $CrO_3$/HMPT | $H_2O_2$ | 3.8 | 1.2 |

TABLE IV-continued

BLEACHING PERFORMANCE OF SULF-11 AND HYDROGEN PEROXIDE IN THE PRESENCE OF VARIOUS TRANSITION METAL CATALYSTS

| METAL CATALYST | OXIDANT | ΔR | ΔΔR |
|---|---|---|---|
| Cobalt Acetate/Acetonitrile | $H_2O_2$ | 3.4 | 0.7 |
| Palladium Acetate | $H_2O_2$ | 2.9 | 0.2 |
| $PtCl_2$ $(PPH_3)_2$ | $H_2O_2$ | 3.3 | 0.6 |
| Dimeric Copper Complex A | $H_2O_2$ | 2.9 | 0.2 |
| $W(O)(O_2)_2(HMPT)(H_2O)$ | $H_2O_2$ | 3.1 | 0.4 |

The control experiment with a ΔR of 2.7 was a value lower than in the previous Tables. This result arises from a difference in the cloth batch. However, relative ranking of the control against the transition metal catalysts is expected to be unaffected by differences in the cloth batch. Dimeric Copper Complex A refers to dicopper (I) (dihydroxyl) (dihexafluorophosphate) complex of di-(bis)2-(2-pyridyl) ethyl)amine)xylenol.

The foregoing description and Examples illustrate selected embodiments of the present invention. In light thereof, various modifications will be suggested to one skilled in the art, all of which are within the spirit and purview of this invention.

What is claimed is:

1. A method for bleaching a stained substrate, said method comprising contacting said stained substrate in an aqueous medium with a peroxygen compound which is hydrogen peroxide or an inorganic substance that generates hydrogen peroxide in water, a $C_1$–$C_{30}$ imine and a transition metal catalyst, the imine having a structure selected from the group consisting of:

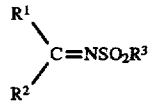

(I)

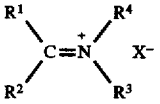

(II)

wherein:

$R^1$ and $R^4$ may be hydrogen or a $C_1$–$C_{30}$ substituted or unsubstituted radical selected from the group consisting of phenyl, aryl, heterocyclic ring, alkyl and cycloalkyl radicals;

$R^2$ may be hydrogen or a $C_1$–$C_{30}$ substituted or unsubstituted radical selected from the group consisting of phenyl, aryl, heterocyclic ring, alkyl, cycloalkyl, nitro, halo, cyano, alkoxy, keto, carboxylic and carboalkoxy radicals;

$R^3$ may be a $C_1$–$C_{30}$ substituted or unsubstituted radical selected from the group consisting of phenyl, aryl, heterocyclic ring, alkyl, cycloalkyl, nitro, halo, and cyano radicals;

$R^1$ with $R^2$ and $R^2$ with $R^3$ may respectively together form a cycloalkyl, polycyclo, heterocyclic or aromatic ring system; and $X^-$ is a counterion stable in the presence of oxidizing agents, said contacting occurring in said medium containing 0.05 to 250 ppm active oxygen from the peroxygen compound per liter water, 0.01 to 300 ppm of imine per liter water and 0.001 to 100 ppm of transition metal catalyst per liter water.

2. The method according to claim 1 wherein the transition metal catalyst is formed from a transition metal selected from the group consisting of chromium, cobalt, titanium, nickel, iron, copper, molybdenum, vanadium, tungsten, palladium, platinum, lanthanum, rhenium, rhodium, ruthenium, manganese and mixtures thereof.

3. A bleaching composition comprising:

i) from 1 to 25% by weight of a peroxygen compound which is hydrogen peroxide or an inorganic substance that generates hydrogen peroxide in water;

ii) from 0.01 to 10% by weight of a $C_1$–$C_{30}$ imine having a structure selected from the group consisting of:

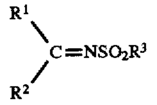

(I)

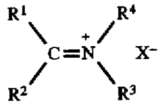

(II)

wherein:

$R^1$ and $R^4$ may be hydrogen or a $C_1$–$C_{30}$ substituted or unsubstituted radical selected from the group consisting of phenyl, aryl, heterocyclic ring, alkyl and cycloalkyl radicals;

$R^2$ may be hydrogen or a $C_1$–$C_{30}$ substituted or unsubstituted radical selected from the group consisting of phenyl, aryl, heterocyclic ring, alkyl, cycloalkyl, nitro, halo, cyano, alkoxy, keto, carboxylic and carboalkoxy radicals;

$R^3$ may be a $C_1$–$C_{30}$ substituted or unsubstituted radical selected from the group consisting of phenyl, aryl, heterocyclic ring, alkyl, cycloalkyl, nitro, halo, and cyano radicals;

$R^1$ with $R^2$ and $R^2$ with $R^3$ may respectively together form a cycloalkyl, polycyclo, heterocyclic or aromatic ring system; and $X^-$ is a counterion stable in the presence of oxidizing agents; and iii) from 0.001 to 10% by weight of a transition metal catalyst.

4. The composition according to claim 3 wherein the transition metal catalyst is formed from a transition metal selected from the group consisting of chromium, cobalt, titanium, nickel, iron, copper, molybdenum, vanadium, tungsten, palladium, platinum, lanthanum, rhenium, rhodium, ruthenium, manganese and mixtures thereof.

5. The composition according to claim 3 delivered in a form selected from the group consisting of a powder, sheet, pouch, tablet, aqueous liquid and non-aqueous liquid.

* * * * *